(12) United States Patent
Voss

(10) Patent No.: US 6,397,322 B1
(45) Date of Patent: May 28, 2002

(54) INTEGRATED INTRINSICALLY SAFE INPUT-OUTPUT MODULE

(75) Inventor: Ralph Thomas Voss, Littleton, MA (US)

(73) Assignee: Schneider Automation, Inc., Palatine, IL (US)

( * ) Notice: Subject to any disclaimer, the term of this patent is extended or adjusted under 35 U.S.C. 154(b) by 0 days.

(21) Appl. No.: 09/540,999

(22) Filed: Mar. 31, 2000

(51) Int. Cl.[7] .................. G06F 15/177; G06F 11/22; G06F 11/273; G08B 1/08

(52) U.S. Cl. ................... 712/35; 712/39; 712/40; 713/340; 714/14; 714/22; 340/532

(58) Field of Search .................. 712/1, 4, 32, 38, 712/39, 40, 35, 36; 361/1, 18, 55, 56, 111, 41, 58; 363/50, 59, 60; 307/84, 85; 713/322, 323, 340, 330, 320; 700/67, 281, 286; 702/2; 340/632, 501, 539, 532; 714/14, 22

(56) References Cited

U.S. PATENT DOCUMENTS

| 4,099,216 A | * | 7/1978 | Weberg | 361/56 |
| 4,190,822 A | * | 2/1980 | Swarbrick | 340/870.39 |
| 4,649,288 A | * | 3/1987 | Barry et al. | 307/84 |
| 4,954,923 A | * | 9/1990 | Hoeflich et al. | 361/111 |
| 4,964,140 A | * | 10/1990 | Yonekura | 375/257 |
| 4,967,302 A | * | 10/1990 | Hutcheon et al. | 361/1 |
| 4,979,067 A | * | 12/1990 | Foley | 361/18 |
| 5,144,517 A | * | 9/1992 | Wieth | 361/55 |
| 5,365,420 A | * | 11/1994 | Cadman | 363/50 |
| 5,841,648 A | * | 11/1998 | Mansfield | 363/59 |

* cited by examiner

Primary Examiner—Daniel H. Pan
(74) Attorney, Agent, or Firm—Michael J. Femal; Larry I. Golden

(57) ABSTRACT

A method and system for performing a task in an intrinsically safe environment using an intrinsically safe, integrated module located on the safe side to convey signals to and from a field device on the hazardous side. The integrated module is configurable in order to suit the electrical characteristics and requirements of the field device. Preferably, the integrated module is software configurable, in that the module can be configured by a command signal without using switches. Furthermore, the integrated module is configurable in order to control the field device in performing the task. The integrated module includes an input/output module which is electrically connected to the field device through a Zener barrier or a galvanic isolation barrier, and a power supply to power the field device through a Zener barrier.

21 Claims, 4 Drawing Sheets

INTEGRATED INTRINSICALLY SAFE INPUT-OUTPUT MODULE

FIELD OF THE INVENTION

The present invention relates generally to an intrinsically safe device and, more specifically, an intrinsically safe module for conveying signals to or from a field device located in a hazardous area.

BACKGROUND OF THE INVENTION

The National Electrical Code mandates that wiring and devices used in a hazardous environment be intrinsically safe in that they are incapable of releasing electrical or thermal energy to cause ignition of a volatile gas or gaseous mixture. In general, an intrinsically safe environment has a safe side and a hazardous side. Not only the device located on the hazardous side must meet the intrinsically safe requirements, but the associated apparatus located on the safe side and electronically linked to the device located on the hazardous side must also be intrinsically safe.

In an intrinsically safe application, it is a common practice to use an intrinsically safe barrier as a safety buffer between a device located on the hazardous side and an apparatus located on the safe side. For example, when a thermocouple is placed in a hazardous area to measure a temperature, the thermocouple is connected to an associated temperature reading apparatus via an intrinsically safe barrier. Both the associated temperature reading apparatus and the intrinsically safe barrier are placed in the safe area. The thermocouple, in this usage, and other devices that are used on the hazardous side of an intrinsically safe environment are commonly referred to as field devices.

Field devices are classified as simple or complex. Simple devices are electrical or electro-mechanical elements that either do not store energy or do not generate more than 1.2 volts, 0.1 amps, 25 mW or 20 femto-Joules. For example, contacts, switches (pressure, flow and level), strain gages, thermocouples, resistance temperature devices (RTDs), light-emitting diodes (LEDs) and resistors are classified as simple field devices. Complex devices may store excess energy capable of causing ignition of a volatile atmospheric mixture. For example, electrical transmitters, solenoids, relays and transducers are classified as complex field devices. Among the above-mentioned electrical and electro-mechanical components, contacts, transmitters and temperature sensors are the most commonly used field devices in intrinsically safe applications.

Transmitters are commonly referred to as analog inputs. They are used to convert a physical measurement such as temperature or pressure into an electrical signal in the 4–20 mA current range to be sent from a hazardous area to a safe area. In the safe area, a signal processor is used to receive the electrical signals and to convert the electrical signals into a temperature or pressure reading. Typically, a transmitter is powered by 24 VDC.

Different field devices may operate at different current ranges and voltage levels. For example, a field device such as an LED is typically rated at 24, 18, 12 or 6 VDC and operates at about 25 mA. Other field devices may operate at a 0–20 mA or 0–25 mA current range.

What type of signal processor is to be used to convey signals to or from a field device depends on the nature of the field device. For example, if the field device is a variable speed rotary valve, then the signal processor must be capable of supplying a current level within a certain current range to vary the valve speed. Thus, when a user uses a field device, he or she must be able to select a signal processor that is capable of handling the current range or voltage level required by the field device. Furthermore, the user must connect one or more intrinsically safe barriers between the field device and the signal processor in order to meet the intrinsic safety requirements. Furthermore, the user may be required to use an intrinsically safe or regulated power supply to provide field power to the field device. The cost incurred to the user in order to meet the intrinsic safety requirements is usually high, and the selection of a suitable signal processor and safety barrier can be very time-consuming.

Therefore, it is advantageous and desirable to provide an intrinsically safe, integrated module such that the user can simply connect the field device to the integrated module without worrying about matching the electrical requirements of the field device.

SUMMARY OF THE INVENTION

It is an object of the present invention to provide an intrinsically safe integrated module containing a signal processor with a plurality of I/O connectors to allow a user to use a field device in an intrinsically safe environment.

It is another object of the present invention to provide an intrinsically safe, integrated module wherein the signal processor and the I/O connectors are configurable to handle different current ranges and/or voltage levels.

The integrated module of the present invention comprises:
a plurality of first intrinsically safe barriers;
a signal processor having a plurality of I/O connectors for conveying signals to or from one or more field devices through the first intrinsically safe barriers;
a second intrinsically safe barrier; and
a power supply to provide electrical power to the field device through the second intrinsically safe barrier.

Preferably, the second intrinsically safe barrier comprises a Zener barrier while the first intrinsically safe barrier can be a Zener barrier or a galvanic isolation barrier.

Preferably, the I/O connectors include at least one input connector and one current output connector so that the input and output connectors form a current loop together with the field device.

Preferably, each I/O connector is software-configurable so that it can handle a plurality of current ranges.

Preferably, each I/O connector is software-configurable so that it can handle a plurality of voltage levels.

The present invention will become apparent upon reading the description taken in conjunction with FIGS. 1–4.

DETAILED DESCRIPTION OF THE INVENTION

Figure 1:
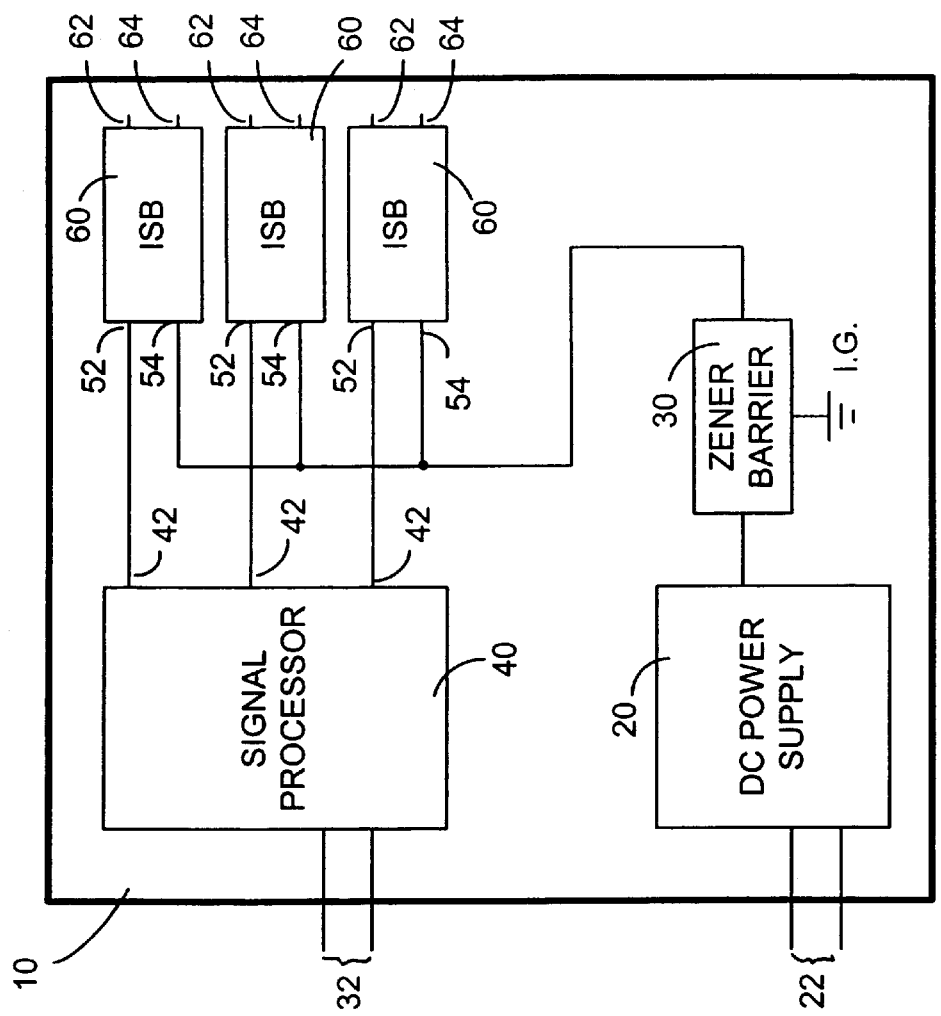
FIG. 1 is a block diagram showing the basic components of the integrated module, according to the present invention.

As shown in FIG. 1, the basic components of the integrated modules 10, of the present invention, include a DC power supply 20, a Zener barrier 30, a signal processor 40 having a plurality of signal inputs 42. The signal inputs 42 are connected through a plurality of intrinsically safe barriers 60 so that the signal processor 40 can be used to convey signals with a field device (80 in FIG. 2) in an intrinsically safe application. As shown, each intrinsically safe barrier 60 has a first input connector 52 to be connected to an input 42 of the signal processor 40, and a second input connector 54 to be connected to the power supply 20 through the Zener barrier 30. Each intrinsically safe barrier 60 also comprises an intrinsically safe input 62 for receiving signals from a field device 80 (FIG. 2), and an intrinsically safe current output 64. The intrinsically safe input 62 and the intrinsically safe current output 64 form a current loop together with a connected field device 80 (see FIG. 2). The intrinsically safe barrier 60 can be a Zener barrier or a galvanic isolation barrier. Zener barriers and galvanic isolation barriers are well-known in the art.

As a common practice, the Zener barrier 30 is grounded to an internal intrinsically safe ground (I.G.). Moreover, a backplane power source (not shown) is connected to the signal processor 40 through terminals 32 for powering the signal processor 40. The same backplane power source or a different backplane power source (not shown) is connected to the DC power supply 20 to provide power thereto through terminals 22.

In one embodiment of the present invention, the signal processor 40 is configured as an input module capable of handling input signals from a field device such as an LED, an RTD, a thermocouple, etc.

In another embodiment of the present invention, the signal processor 40 is configured as an output module capable of handling output signals to a field device such as a flow control valve, a variable speed rotary valve, a variable speed crew conveyor, etc.

In yet another embodiment of the present invention, the signal processor 40 is configured as a discrete output module capable of handling output signals to a field device such as a pilot light, a motor starter, etc.

Depending on what field device is used in an intrinsically safe application, the current drawn through the input 62 and the output 64 may range from 4 to 20 mA, 0 to 25 mA or 0 to 20 mA. Likewise, the voltage level at the output 64 for powering a field device may be 24 VDC, 18 VDC, 12 VDC or 6 VDC.

Preferably, the operable current range or voltage level of each input 62 and output 64 can be selected to suit the electrical requirements of the field device 80.

Preferably, the selection of the current range or voltage level is carried out by a command signal, instead of a mechanical switch or DIP switch. In that respect, the integrated module 10 is "soft-configurable" regarding the selection of an I/O current range and a voltage level.

Figure 3:
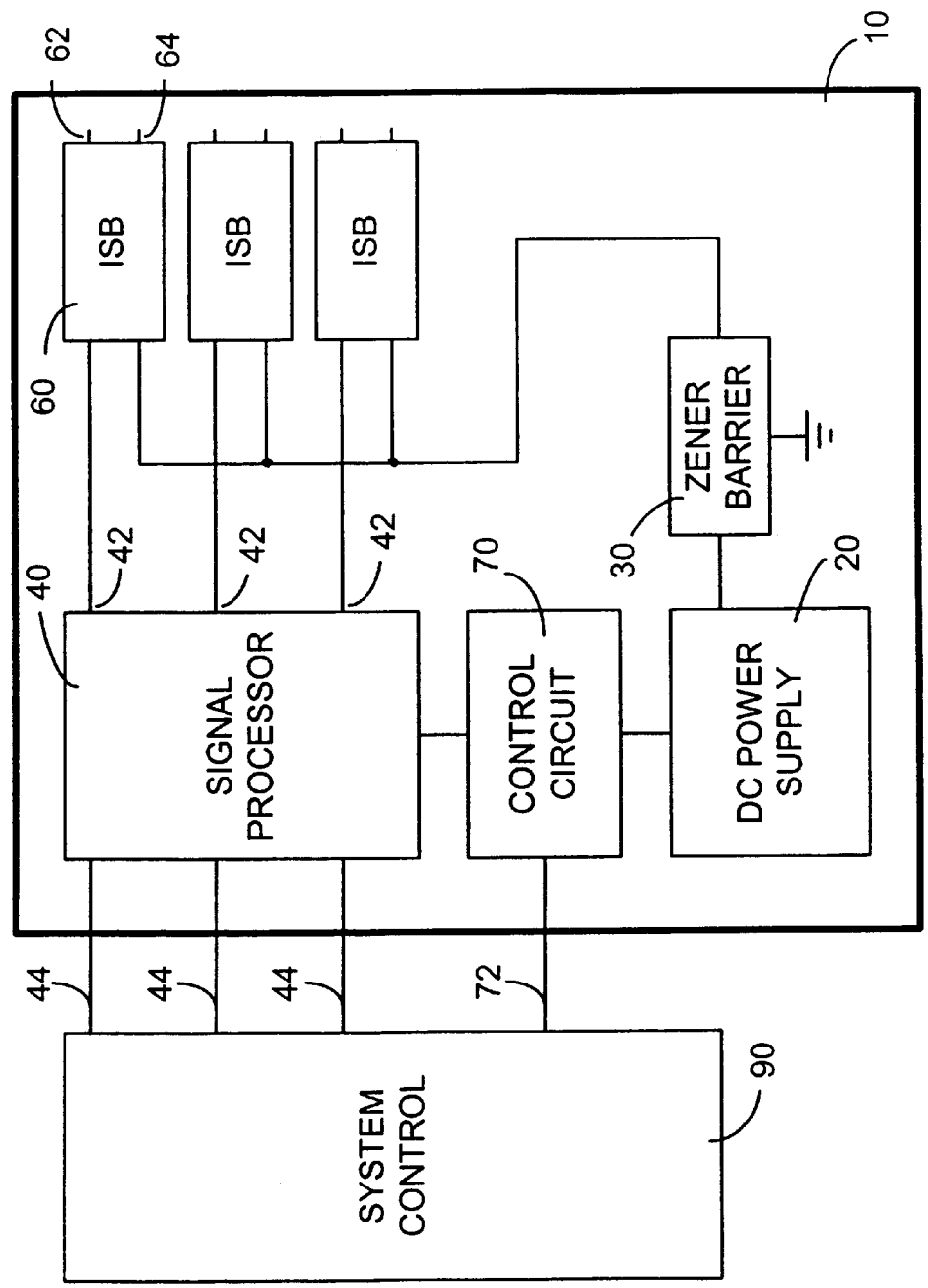
FIG. 3 is a block diagram showing a system control connected to an integrated module for changing the input/output characteristics of the integrated module.

Preferably, the command signal for selecting the I/O current range and voltage level is received from a separate controlling device which is connected to the integrated module 10 as shown in FIG. 3.

Figure 2:
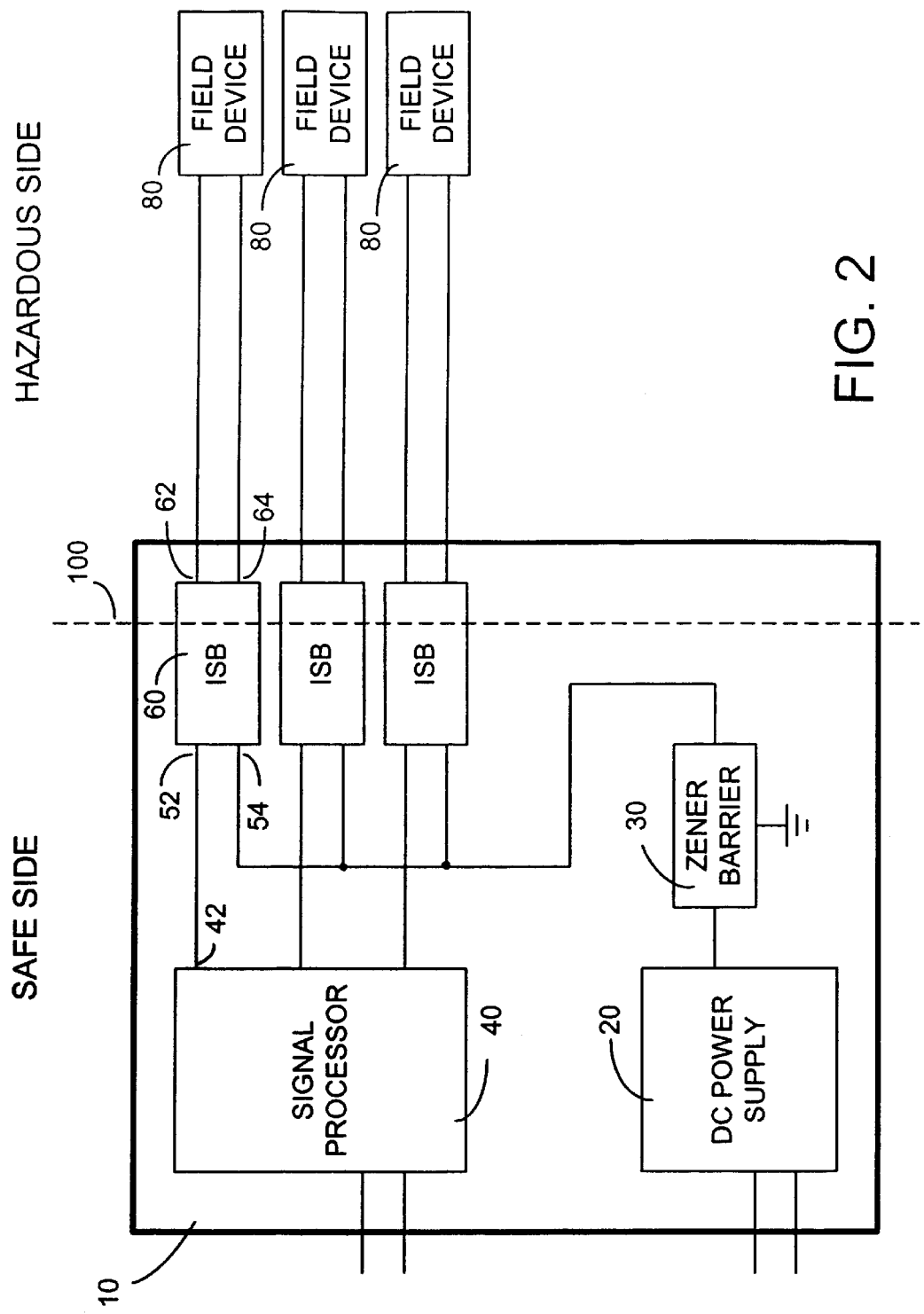
FIG. 2 is a block diagram showing a typical application of the integrated module.

A typical intrinsically safe application using the integrated module 10 is shown in FIG. 2. As shown, the intrinsically safe environment has a safe side and a hazardous side, separated by the dash line 100. The integrated module 10 is located on the safe side. One or more field devices 80 located on the hazardous side are separately connected to the input 62 and the current output 64 to form a current loop. As each of the field devices 80 is used to make a physical measurement, it conveys electrical signals through a respective input 62. Through the respective intrinsically safe barrier 60, the electrical signals are conveyed to a respective input 42 of the signal processor 40. The signal processor 40 converts the received signals into a value or a reading representative of the physical measurement.

In order that the integrated module 10 can be used with a variety of field devices having different electrical requirements and characteristics, it is preferable that the integrated module 10 can be configured such that the operable current range or voltage level of each input 62 and current output 64 can be specified or selected. In one embodiment of the present invention, a control circuit 70 implemented on the integrated module 10 is used to change the operable current range or voltage level. However, the control circuit 70 can also be physically separated from the integrated module 10. As shown, a system control 90 is connected to the integrated module 10 to receive measurement signals 44 representative of the physical measurements made by the field devices 80 (see FIG. 2). The system control 90 also conveys a command signal 72 to the control circuit 70 to configure the integrated module 10. The control circuit 70 can be designed to change the output voltage of the power supply 20, for example, or to change the input impedance of the input 42 of the signal processor 40. With such an arrangement, there is no need to use a DIP switch or other switch to change the operable current range and voltage level. In that respective, the integrated module 10 is "soft-configurable". The system control 90 can be a personal computer, a programmable logic controller (PLC) or a similar device.

When the integrated module 10 is used as an output module to control a field device such as a starter motor or a flow valve, for example, the integrated module 10 functions like an ON/OFF switch having an "ON" state and an "OFF" state. When the integrated module 10 is used to perform a series of tasks by turning the field device 80 on and off, these states can be selected or changed by the system control 90 by sending a command signal 72 to the control circuit 70. In a power-off situation when the system control 90 is turned off or does not function properly, it is preferable that the integrated module 10 operate at a certain state. For example, the integrated module 10 can be configured to "Hold the Last State", "Go to a Predefined State", or "Operate at an Off State" in a power-off situation. The selectability of the power-off states can be achieved with software.

Figure 4:
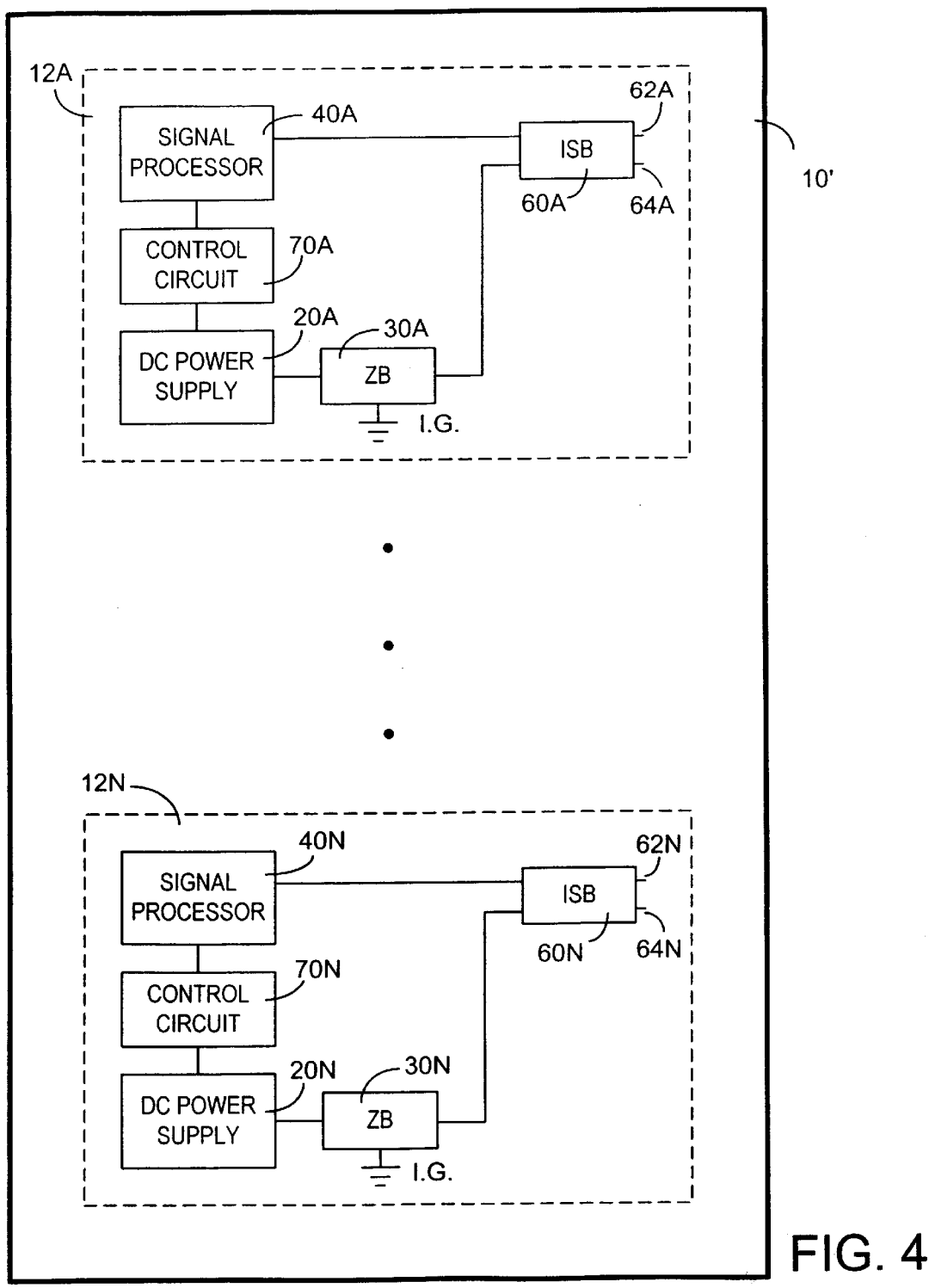
FIG. 4 is a block diagram showing a number of sub-modules incorporated within an integrated module.

It is also advantageous to incorporate a plurality of sub-modules into one integrated module. As shown in FIG. 4, the integrated module 10' includes sub-modules 12A, . . . , 12N. Each sub-module is itself an intrinsically safe module, similar to the integrated module 10 shown in FIGS. 1–3. With each sub-module 12 having its own signal processor 40, power supply 30 and control circuit 70, one sub-module 12 can be configured to operate at a different current range and/or voltage level from other sub-modules 12. For example, the current output at output 64A can be in the 4–20 mA range, while the current output at output 64N can be in the 0–25 mA range. Furthermore, one sub-module can be configured to become an input module to handle input signals from a field device such as a thermocouple, while another sub-module can be configured to become an output module to handle output signals to a field device such as a flow control valve. Each sub-module 12 can be controlled to function independently from the other. In that respect, the sub-modules 12 are addressable and one or more integrated modules 10' can be controlled by a single PLC or personal computer.

The intrinsically safe, integrated module of the present invention can be used in numerous industries where there is consideration of ignition in locations made hazardous by the presence of flammable or combustible materials under normal atmospheric conditions. Such industries include printing presses, chemical processing, oil and gas production and transport, mining, explosive manufacturing, etc.

Although the present invention has been disclosed with the preferred embodiments thereof, it will be understood by those skilled in the art that the foregoing and various other changes, omissions and deviations in the form and detail thereof may be made without departing from the spirit and scope of this invention.

What is claimed is:

1. An integrated module to be used in conjunction with a field device in an intrinsically safe environment having a safe side and a hazardous side, wherein the field device is located on the hazardous side while the integrated module is located on the safe side, said module comprising:

a first intrinsically safe barrier;

a signal processor having a plurality of I/O connectors for conveying signals to or from the field device through the first intrinsically safe barrier;

a second intrinsically safe barrier;

a power supply to provide electrical power to the field device through the second intrinsically safe barrier and the first intrinsically safe barrier; and a control circuit operatively connected to the signal processor and the power supply, wherein the signal processor has electrical characteristics necessary for processing said signals, and the power supply has a plurality of power settings, and wherein the control circuit can be used to change the electrical characteristics of the signal processor and to select the power setting of the power supply to meet operating current/voltage requirements of the field device.

2. The integrated module of claim 1, wherein the second intrinsically safe barrier comprises a Zener barrier.

3. The integrated module of claim 1, wherein the first intrinsically safe barrier comprises a galvanic isolation barrier.

4. The integrated module of claim 1, wherein the first intrinsically safe barrier comprises a Zener barrier.

5. The integrated module of claim 1, wherein the I/O connectors comprise at least one input connector and one output connector.

6. The integrated module of claim 5, wherein the input connector and the output connector form a current loop together with the field device.

7. The integrated module of claim 1, wherein the signal processor comprises an input module capable of handling input signals from the field device such as an LED, an RTD or a thermocouple.

8. The integrated module of claim 1, wherein the signal processor comprises an output module capable of handling output signals to the field device such as a flow control valve, a variable speed rotary valve, or a variable speed screw conveyor.

9. The integrated module of claim 1, wherein the signal processor comprises a discrete input module capable of handling input signals from the field device such as a push-button, a limit switch, a level switch or a pressure switch.

10. The integrated module of claim 1, wherein the signal processor comprises a discrete output module capable of handling output signals to the field device such as a pilot light or a motor starter.

11. The integrated module of claim 1, further comprises means for controlling the signal processor and/or the power supply so as to configure the integrated module to suit electrical requirements of the field device.

12. The integrated module of claim 11, wherein the controlling means receives an external command signal in order to configure the integrated module.

13. A method of conveying signals between a field device in a hazardous area and an associated input/output module in a safe area, wherein the field device has electrical requirements for performing an intended function, and wherein the associated input/output module comprises:

a power supply having a plurality of power settings to provide electrical power to the field device; and a control circuit operatively connected to the power supply, said method comprising the step of sending a command signal to the associated input/output module so as to allow the control circuit to select the power setting to meet the electrical requirements of the field device.

14. The method of claim 13, wherein the associated input/output module is addressable so as to allow the command signal be sent to the associated input/output module using an address.

15. The method of claim 13, wherein the associated input/output module includes a power supply to power the field device at a current range and a voltage level, and wherein the power supply is configurable to change the current range and/or the voltage level to suit the electrical requirements of the field device.

16. A system for performing a task in an intrinsically safe environment having a safe side and a hazardous side, said system comprising:

a field device located on the hazardous side having electrical requirements to perform the task; and an associated intrinsically safe input/output module located on the safe side and electrically connected to the field device for conveying signals therebetween, wherein the input/output module comprises a power supply having a plurality of power settings to provide electrical power to the field device, and a control circuit operatively connected to the power supply to select the power setting to meet the electrical requirements of the field device.

17. The system of claim 16, further comprising a control device located on the safe side for configuring the associated input/output module.

18. The system of claim 17, wherein a command signal is conveyed to the control device for configuring the associated input/output module.

19. The system of claim 16, wherein the associated input/output module comprises a power supply to power the field device and wherein the power supply is configurable to suit the electrical requirements of the field device.

20. A method of performing a task by a field device in a hazardous area, wherein the field device has electrical requirements for performing the task and is connected to an associated intrinsically safe module located in a safe area for conveying signals between the field device and the module, and wherein the module comprises a power supply having a plurality of power settings to provide electrical power to the field device, and a control circuit operatively connected to the power supply, wherein the module is configurable so as to allow the control circuit to select the power setting of the power supply to meet the electrical requirements of the field device, said method comprising the step of sending a command signal to the module in order to configure the module.

21. The method of claim 20, wherein the module is addressable so as to allow a system control to send the command signal to the module using an address.

* * * * *